United States Patent
Kang (10) Patent No.: US 9,862,367 B2
(45) Date of Patent: Jan. 9, 2018

(54) MASTER CYLINDER FOR BRAKE SYSTEM

(71) Applicant: Mando Corporation, Pyeongtaek-si, Gyeonggi-do (KR)

(72) Inventor: Dong Koo Kang, Seoul (KR)

(73) Assignee: MANDO CORPORATION, Pyeongtaek-Si, Gyeonggi-do (KR)

( * ) Notice: Subject to any disclaimer, the term of this patent is extended or adjusted under 35 U.S.C. 154(b) by 35 days.

(21) Appl. No.: 14/919,471

(22) Filed: Oct. 21, 2015

(65) Prior Publication Data

US 2016/0114774 A1   Apr. 28, 2016

(30) Foreign Application Priority Data

Oct. 23, 2014   (KR) .................. 10-2014-0143899

(51) Int. Cl.
*B60T 11/28* (2006.01)
*B60T 11/16* (2006.01)
*B60T 11/22* (2006.01)

(52) U.S. Cl.
CPC ............... *B60T 11/28* (2013.01); *B60T 11/16* (2013.01); *B60T 11/22* (2013.01)

(58) Field of Classification Search
CPC ........... B60T 11/28; B60T 11/16; B60T 11/22
USPC ........................................................ 60/533
See application file for complete search history.

(56) References Cited

U.S. PATENT DOCUMENTS

| 6,014,862 A * | 1/2000 | Shaw ..................... B60T 7/042 60/533 |
| 2006/0179836 A1* | 8/2006 | Ishikawa ............... B60T 11/236 60/533 |

* cited by examiner

*Primary Examiner* — F. Daniel Lopez
*Assistant Examiner* — Daniel Collins
(74) *Attorney, Agent, or Firm* — McDermott Will & Emery LLP

(57) ABSTRACT

Disclosed is a master cylinder for a brake system. The master cylinder includes a cylinder body that has a bore therein; at least one piston provided in the bore to be moved forwards and rearwards; a liquid pressure chamber compressed by the piston; a brake liquid port that is connected to a reservoir and configured to supply brake liquid to the liquid pressure chamber; and a brake liquid discharge opening for discharging the brake liquid in the liquid pressure chamber to a wheel brake of a wheel. A valve unit that includes a check valve to control the unidirectional flow of the brake liquid that is introduced from the reservoir to the liquid chamber and a fluid resistance hole opened in two directions and is smaller than the size of the brake liquid discharge opening is provided in the brake liquid port.

14 Claims, 5 Drawing Sheets

MASTER CYLINDER FOR BRAKE SYSTEM

CROSS-REFERENCE TO RELATED APPLICATION

This application claims priority from and the benefit under 35 U.S.C. §119(a) of Korean Patent Application No. 10-2014-0143899, filed on Oct. 23, 2014, which is hereby incorporated by reference for all purposes as if fully set forth herein.

BACKGROUND OF THE INVENTION

1. Field of the Invention

The present invention relates to a master cylinder for a brake system, and more particularly, to a a master cylinder for a brake system that can improve a braking feeling.

2. Description of the Prior Art

In a vehicle's hydraulic brake system, a master cylinder is an apparatus that generates hydraulic pressure according to the pedaling of the driver and sends the hydraulic pressure that is necessary to the brakes that are installed in the wheels of the vehicle in order to perform the braking operation.

Figure 1:
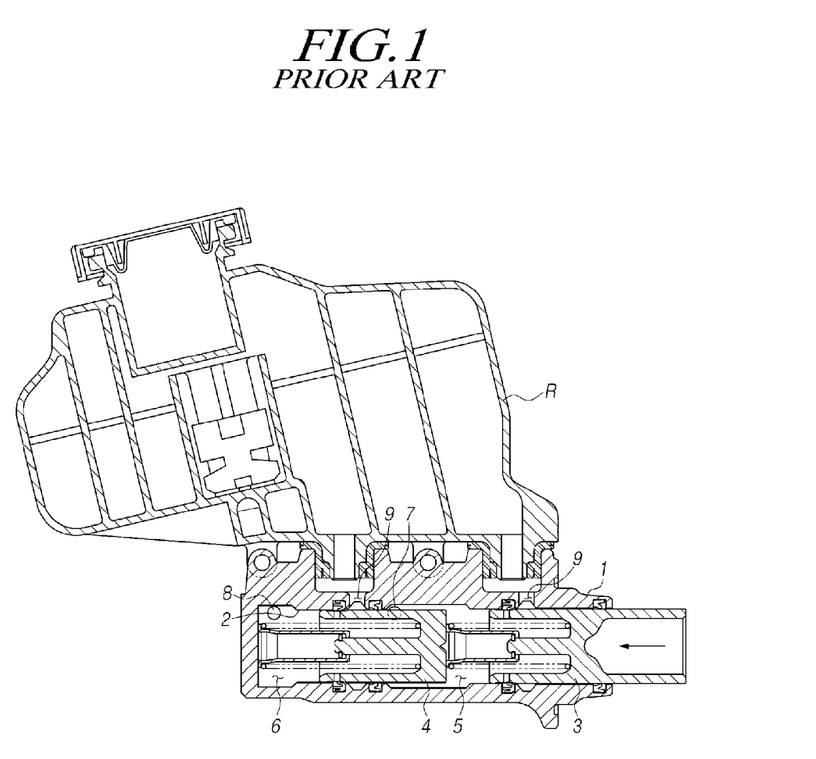
FIG. 1 is a sectional view illustrating a master cylinder for a brake system according to the related art.

FIG. 1 illustrates a general tandem type master cylinder. Referring to the drawing, the master cylinder includes a first piston 3 and a second piston 4, which are installed in a bore 2 of a cylinder body 1 in series to be moved forwards and rearwards, and the interior of the bore 2 is divided into a first liquid pressure chamber 5 and a second liquid pressure chamber 6 by the first piston 3 and the second piston 4.

According to the master cylinder, the first piston compresses the brake liquid in the first liquid pressure chamber 5 while being moved forwards in the direction of an arrow through the pedaling of the driver, the pressure of the brake liquid in the first liquid pressure chamber 5 presses the second piston 4, and the second piston 4 compresses the brake liquid in the second liquid pressure chamber 6. The brake liquid in the first liquid pressure chamber 5 is supplied to a wheel brake for braking two wheels through the first brake liquid discharge opening 7, and the brake liquid in the second liquid pressure chamber 6 is supplied to a wheel brake for braking the other two wheels through the second brake liquid discharge opening 8.

The master cylinder includes a brake liquid port 9, which is connected to a reservoir R provided above the cylinder body 1, and in which the brake liquid is stored to supply the brake liquid to the liquid pressure chambers 5 and 6. Because the brake liquid port 9 simply functions as a passage for the brake liquid between the master cylinder and the reservoir, it cannot effectively control the flow of the brake liquid according to the pressure of the liquid pressure chambers that are necessary when a prompt braking operation is required.

For example, the pressure of the liquid pressure chambers 5 and 6 should be increased by closing the brake liquid port 9 while the piston is moved forwards in order to perform a braking operation, and because the brake liquid in the liquid pressure chamber is substantially discharged to the reservoir such that the liquid pressure chamber is not sealed in the piston movement section from an initial standby position to a position where the brake liquid port 9 may be closed, a braking operation is not performed in the section.

The section in which a braking operation cannot be performed is called a lost travel. The lost travel is present in order to prevent a phenomenon in which a braking pressure is generated irrespective of the intention of the driver as a caliper pad is moved rearwards or a peripheral temperature rises. For example, a drag due to an abnormal expansion of the fluid in the liquid pressure chamber.

PRIOR TECHNICAL DOCUMENTS

Patent Documents (Patent Document 1) Korean Patent Application Publication No. 2008-0088053 (Oct. 2, 2008)

SUMMARY OF THE INVENTION

A master cylinder for a brake system, according to an embodiment of the present invention, reduces the lost travel in order to allow a prompt braking operation.

Also, a master cylinder for a brake system, according to an embodiment of the present invention, prevents a braking pressure from being generated irrespective of the intention of the driver.

In accordance with an aspect of the present invention, there is provided a master cylinder for a brake system, including: a cylinder body that has a bore therein; at least one piston provided in the bore to be moved forwards and rearwards; a liquid pressure chamber compressed by the piston; a brake liquid port connected to a reservoir and configured to supply brake liquid to the liquid pressure chamber; and a brake liquid discharge opening for discharging the brake liquid in the liquid pressure chamber to a wheel brake of a wheel, wherein a valve unit including a check valve for controlling unidirectional flows of the brake liquid introduced from the reservoir to the liquid chamber and a fluid resistance hole opened in two directions that is smaller than the size of the brake liquid discharge opening is provided in the brake liquid port.

The cross-sectional shape of the fluid resistance hole may be circular and the diameter thereof may be 0.1 mm to 0.7 mm.

Two or three fluid resistance holes may be provided.

The check valve may include: a valve housing that has a communication hole at the center thereof; a valve body that is elevated on a lower side of the communication hole and configured to open and close the communication hole; a valve spring that supports the valve body and is configured to close the communication hole by pressing the valve body towards the communication hole; and a valve seat coupled to the valve housing while supporting the valve spring, and the fluid resistance hole may be provided around the communication hole of the valve housing.

A circumferential groove may be formed an the outer peripheral surface of the valve housing, and a ring-shaped resilient member may be coupled to the groove.

Two or three fluid resistance holes may be provided to be circumferentially spaced apart from each other around the communication hole of the valve housing.

In accordance with another aspect of the present invention, a master cylinder is provided for a brake system, including: a cylinder body that has a bore therein; at least one piston provided in the bore to be moved forwards and rearwards; a liquid pressure chamber compressed by the piston; a brake liquid port connected to a reservoir and configured to supply brake liquid to the liquid pressure chamber; and a brake liquid discharge opening for discharging the brake liquid in the liquid pressure chamber to a wheel brake of a wheel, wherein a valve unit including a check valve is closed during a braking operation and opened when the braking operation is released, the check valve being configured to supply the brake liquid from the reservoir to the liquid pressure chamber, and a fluid resistance hole opened in two directions and configured to discharge a large amount of the brake liquid in the liquid pressure chamber to the brake liquid discharge opening during the braking operation is provided in the brake liquid port.

The fluid resistance hole may be smaller than the brake liquid discharge opening.

The diameter of the fluid resistance hole may be 0.1 mm to 0.7 mm, and two or three fluid resistance holes may be provided.

The check valve may include: a valve housing that has a communication hole at the center thereof; a valve body elevated on the lower side of the communication hole and configured to open and close the communication hole; a valve spring supporting the valve body and configured to close the communication hole by pressing the valve body towards the communication hole; and a valve seat coupled to the valve housing while supporting the valve spring, and the fluid resistance hole may be provided around the communication hole of the valve housing.

The fluid resistance hole may include a porous filter to reduce the fluid velocity of the brake liquid that is discharged through the brake liquid discharge opening during a braking operation.

According to a master cylinder for a brake system, according to an embodiment of the present invention, a lost travel can be reduced and a braking reaction can be improved by promptly increasing the initial amount of liquid during a braking operation of a first liquid pressure chamber and a second liquid pressure chamber by installing a value unit including a fluid resistance hole in a brake liquid port.

Furthermore, according to a master cylinder for a brake system according to an embodiment of the present invention, braking pressure can be effectively prevented from being generated irrespective of the intention of the driver by installing a valve unit including a fluid resistance hole in a brake liquid port and thus preventing the brake liquid of the liquid pressure chamber from being abnormally expanded.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described with reference to the accompanying drawings. Before the description, the terms or words used in the specifications and claims should not be limited to be construed as usual or dictionary definition but should be rather construed to be consistent with the technical spirits of the present invention based on the principle that the inventors may properly define the terms used in the specification to describe their invention in the best manner. Accordingly, it should be understood that the embodiments described in the specification and configurations disclosed in the drawings are merely examples and do not represent all of the technical spirits of the invention and various modifications and variations to the invention and equivalents thereof may be made at the time of the invention FIG. 2 is a view illustrating a master cylinder for a brake system according to an embodiment of the present invention.

Figure 2:
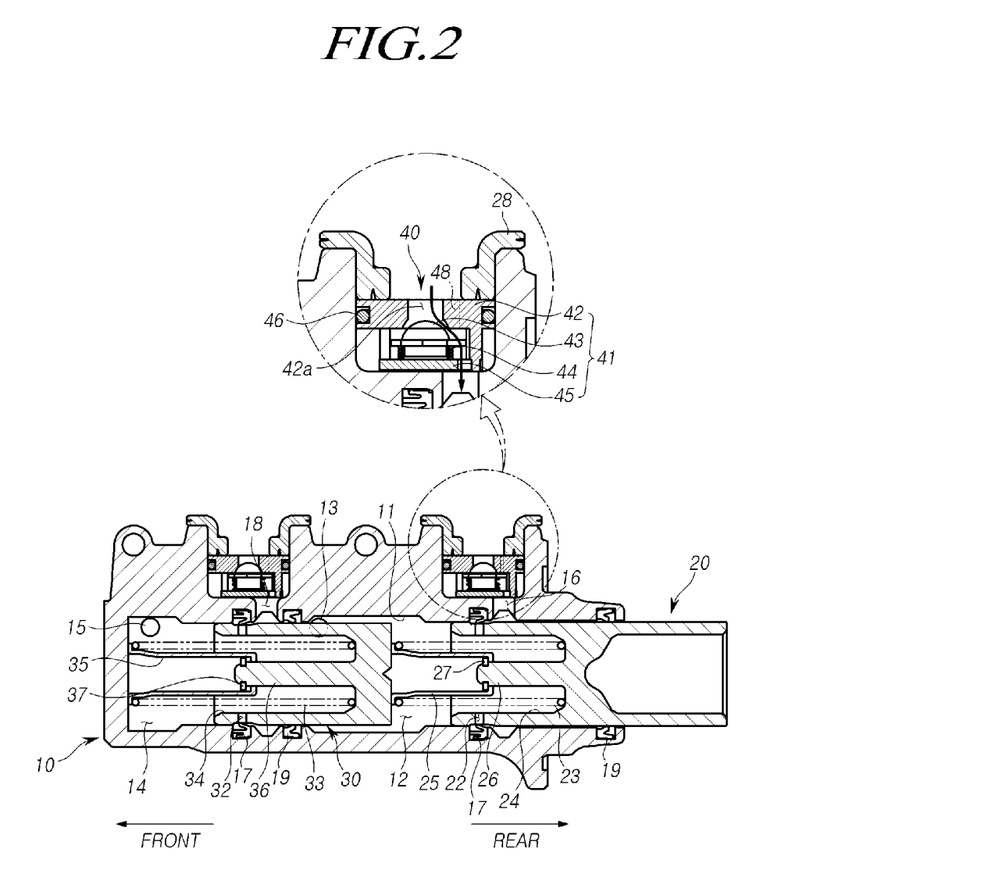
FIG. 2 is a sectional view illustrating a master cylinder for a brake system that includes a valve unit according to an embodiment of the present invention.

Referring to FIG. 2, the master cylinder for a brake system, according to an embodiment of the present invention, includes a cylinder body 10 that has a bore 11, and first and second pistons 20 and 30 that are installed in the bore 11 of the cylinder body 10 to be moved forwards and rearwards.

The cylinder body 10 includes a first liquid pressure chamber 12 formed between the first piston 20 and the second piston 30, and a second liquid pressure chamber 14 formed between the second piston 30 and an inner surface of a distal end of the bore 11.

First and second brake liquid ports 16 and 18 connected to a reservoir R are provided at an upper portion of the cylinder body 10. The first and second brake liquid ports 16 and 18 communicate with the first and second liquid pressure chamber 12 and 14, and are formed between a sealing member 17 and a packing member 19.

The sealing member 17 and the packing member 19 are provided to seal the inside of the cylinder body 10 and the outsides of the first and second pistons 20 and 30 to prevent leakage of a brake liquid between the inner peripheral surface of the bore 11 and the first and second pistons 20 and 30, and to form a high liquid pressure. The sealing member 17 and the packing member 19 are installed in accommodation grooves formed on the inner surface of the bore 11 so as not to be moved even when the first and second pistons 20 and 30 are moved forwards and rearwards.

A first brake liquid discharge hole 13 is formed at a portion of the inner side of the cylinder body 10 close to the first liquid chamber 12, and a second brake liquid discharge opening 15 is formed at a portion of the inner side of the cylinder body 10 close to the second liquid pressure chamber 14 such that the brake liquid in the first and second liquid pressure chambers 12 and 14 are discharged when the first and second liquid pressure chambers 12 and 14 are pressed by the first and second pistons 20 and 30. The brake liquid in the first and second liquid pressure chambers 12 and 14 is discharged through the first and second brake liquid discharge openings 13 and 15, and is supplied to the wheel brakes (not illustrated) of the wheels.

Meanwhile, the first and second pistons 20 and 30 are installed in the bore 11 to be moved forwards and rearwards to generate a braking hydraulic pressure in the first and second liquid pressure chambers 12 and 14. Although the first piston 20 and the second piston 30 are arranged in series in the embodiment of the present invention, they may be arranged in parallel through appropriate modifications and corrections by those skilled in the art.

The first and second pistons 20 and 30 are moved forwards and rearwards in the bore 11 of the cylinder body 10. For example, the first and second pistons 20 and 30 are moved forwards (to the left side of the drawing) in the bore 11 of the cylinder body 10 in order to increase the pressures of the first and second liquid pressure chambers 12 and 14 and to form a braking hydraulic pressure during a braking operation, and are moved rearwards (to the right side of the drawing) in the bore 11 of the cylinder body 10 if the braking operation is released.

A plurality of communication passages 22 and 32 that communicate the inner and outer surfaces of the first and second pistons 20 and 30 are formed in the first and second pistons 20 and 30 such that the brake liquid in the reservoir may be introduced into the first and second liquid pressure chambers 12 and 14 through the first and second brake liquid ports 16 and 18. The communication passages 22 and 32 are opened if the first and second pistons 20 and 30 are moved rearwards such that the brake liquid in the first and second liquid pressure chambers 12 and 14 may be supplemented, and are closed if the first and second pistons 20 and 30 are moved forwards such that the first and second liquid pressure chambers 12 and 14 may be compressed by the first and second pistons 20 and 30.

First and second return springs 23 and 33, which return the first and second pistons 20 and 30 to the original positions in the first liquid pressure chamber 12 and the second liquid pressure chamber 14 after the completion of the braking operation, are provided on the front side of the first and second pistons 20 and 30. The first and second pistons 20 and 30 have spring accommodation recesses 24 and 34 for accommodating the first and second return springs 23 and 33 therein, respectively, in order to reduce the entire length of the master cylinder.

First and second supports 26 and 36 protrude from the spring accommodation recesses 24 and 34 of the first and second pistons 20 and 30 such that first and second retainers 25 and 35 that support the first and second return springs 23 and 33 may be installed. The first and second retainers 25 and 35 that support the first and second return springs 23 and 33, respectively, are mounted on the first and second supports 26 and 36 to be moved forwards and rearwards. Reference numerals 27 and 37 denote step rings to prevent the retainers 25 and 36 from being separated from the first and second supports 26 and 36. Due to the step rings 27 and 37, the ends of the first and second return springs 23 and 33 are supported by the insides of the spring accommodation recesses 24 and 34 and the opposite ends thereof are supported by the flange type ends of the retainers 25 and 35.

Meanwhile, in the brake liquid port 16 illustrated in FIG. 2 while being enlarged, reference numeral 28 denotes a seal for preventing the brake liquid from being leaked between the reservoir (not illustrated) and the master cylinder coupled to each other through the brake liquid port 16.

According to the embodiment of the present invention, the first brake liquid port 16 (the same is applied to the second brake liquid port 18) is provided with a valve unit 40 including a check valve 41 and a fluid resistance hole 48 to effectively control the bidirectional flows of the brake liquid during a braking operation or if the braking operation is released.

The check valve 41 is closed at an initial stage of a braking operation, and is opened when the pistons 20 and 30 return to the original positions after the braking operation is released. The check valve 41 is closed at an initial stage of the braking operation because an amount of the brake liquid transferred to a wheel brake (not illustrated) may be increased by discharging the brake liquid in the first and second liquid pressure chambers 12 and 14 through the first and second brake liquid discharge openings 13 and 15 promptly at an initial stage of the braking operation. If the amount of the brake liquid is increased at an initial stage of the brake operation, a brake response speed and a brake feeling may be improved.

Figure 3:
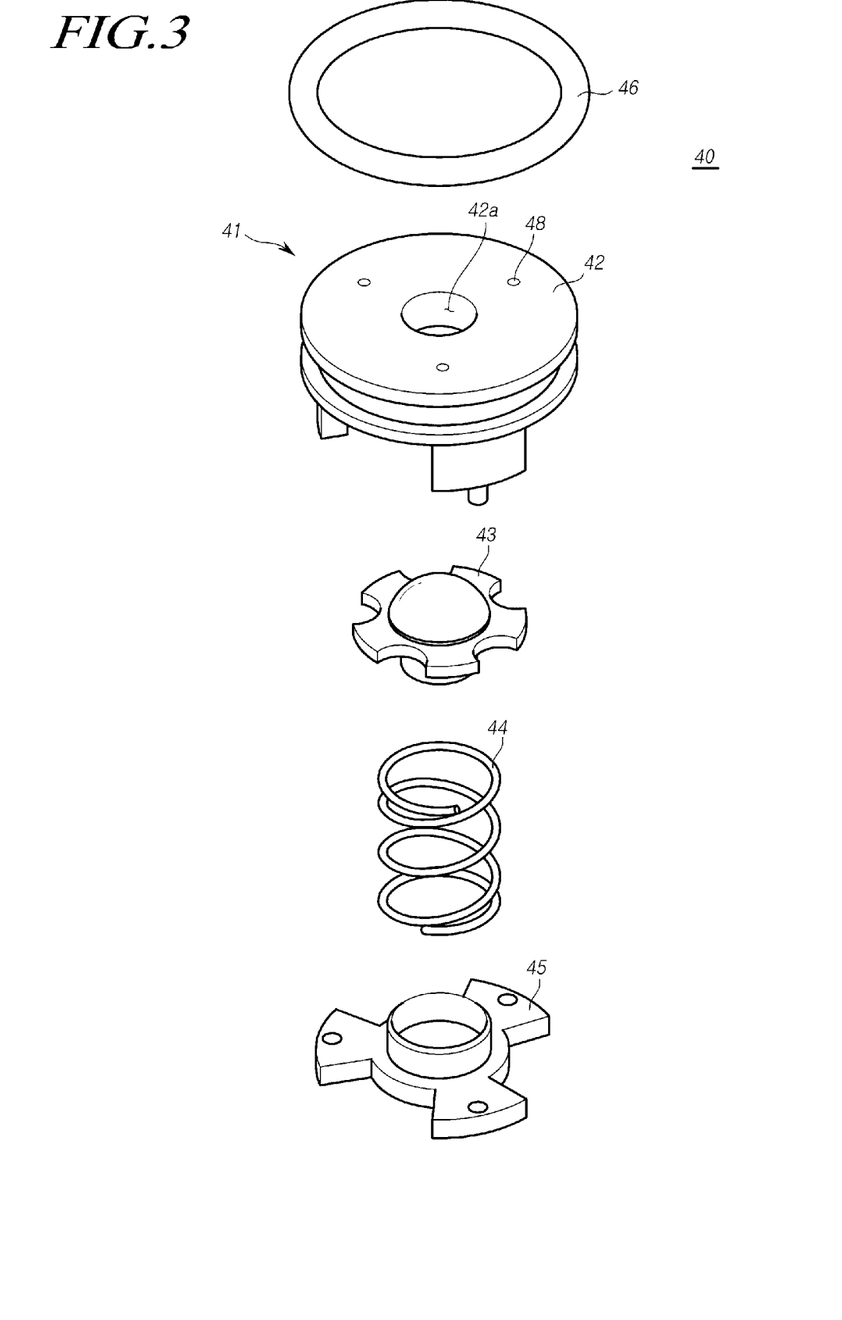
FIG. 3 is an expanded perspective view illustrating a check valve of a master cylinder for a brake system according to an embodiment of the present invention.

The check valve 41 will be described in more detail with reference to the enlarged view of FIG. 2 and FIG. 3. Moreover, because the valve units 40 are installed in the first brake liquid port 16 and the second brake liquid port 18 in the same way, the first brake liquid port 16 will be described below as an example.

The check valve 41 is installed in the first brake liquid port 16, and is selectively opened and closed from the reservoir (not illustrated) towards the liquid pressure chambers 16 and 18 to control the flow of the brake liquid.

The check valve 41 includes a valve housing 42 that has a communication hole 42a at the center thereof, a valve body 43 having a dome shape for opening and closing the communication hole 42a on a lower side thereof, a valve spring 44 for supporting the valve body 43 to press the valve body 43 towards the communication hole 42a such that a passage is closed, and a valve seat 45 coupled to the valve housing 42 while supporting the valve spring 44.

The check valve 41 having the above configuration may be assembled as a single product, and accordingly, the finally assembled check valve 41 may be easily installed in the brake liquid port while a resilient member 46 is interposed between the check valve 41 and the brake liquid port. That is, a circumferential groove is formed on the outer peripheral surface of the valve housing, and a ring-shaped resilient member may be coupled to the groove and installed in the brake liquid port.

Meanwhile, the valve housing 42 includes one or more fluid resistance holes 48 provided around the communication hole 42a. The fluid resistance holes 48 prevent braking pressure from being generated due to braking pressure that is generated irrespective of the intention of the driver according to rearward movement of a caliper pad and/or a rise in peripheral temperature, for example, irrespective of the braking intention of the driver as a result of an abnormal expansion of the brake liquid in the liquid pressure chamber.

The fluid resistance holes 48 have a polygonal or circular cross-section, and are smaller than that of the brake liquid discharge opening 13 provided in the liquid pressure chamber 12. Because the amount of the brake liquid that is discharged through the brake liquid discharge opening 13 to form a braking pressure is reduced due to the brake liquid discharged from the liquid pressure chamber 12 to the reservoir through the fluid resistance holes 48, if the size of the fluid resistance holes 48 is the same as or larger than the size of the brake liquid discharge opening 13, a lost travel is not reduced, but rather, a time by which an appropriate pressure necessary for a braking operation may be reached increases. In contrast, a necessary appropriate pressure may be reached more promptly because the amount of the brake liquid that is discharged to the brake liquid discharge opening 13 in unit area increases due to a reduction in the amount of the brake liquid that is discharged through the fluid resistance holes 48 if the size of the fluid resistance holes 48 is smaller than the size of the brake liquid discharge opening 13.

Here, although it has been exemplified in the embodiment of the present invention that the size of the fluid resistance holes 48 is smaller than the size of the brake liquid discharge opening 13 such that a larger amount of the brake liquid may be discharged through the brake liquid discharge opening 13 of the brake liquid discharge opening 13 and the fluid resistance holes 48 through which the brake liquid is discharged from the liquid pressure chamber, the present invention is not limited thereto, but the same effect can be realized, for example, by installing porous filters in the fluid resistance holes 48 even though the size of the fluid resistance holes 48 becomes larger in order to make the velocity of the brake liquid, which passes through the fluid resistance holes, lower than the velocity of the brake liquid that is discharged through the brake liquid discharge opening 13.

The diameter of the fluid resistance holes 48 is 0.1 mm to 0.7 mm, and a plurality of fluid resistance holes 48 are properly arranged with respect to the communication hole 42a of the valve body 43.

Figure 4:
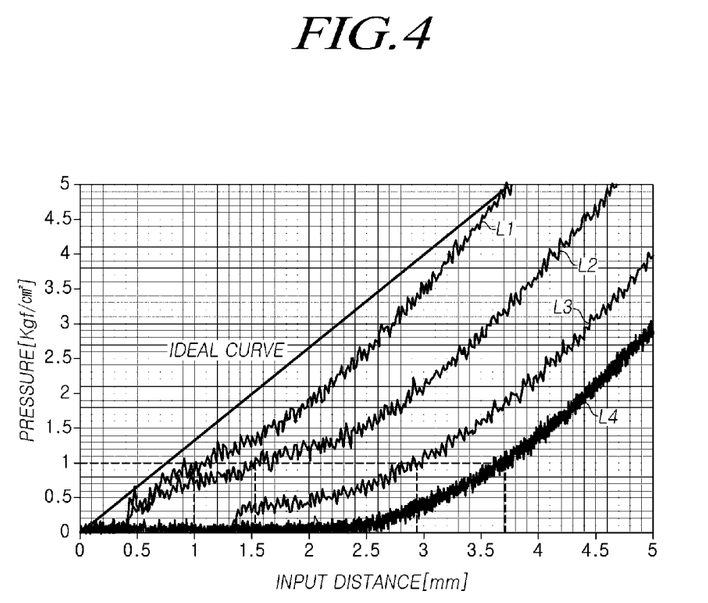
FIG. 4 is a graph for explaining the diameters of a fluid resistance hole of the master cylinder for a brake system and an effect thereof according to an embodiment of the present invention.

FIG. 4 is a graph illustrating an input distance (a movement distance of a brake pedal) necessary to reach a predetermined braking pressure according to the diameter of the fluid resistance holes. The line in the graph represents that the brake pedal is moved by about 1 mm to output a braking pressure of 1 kgf/cm$^2$, and it is assumed in the embodiment of the present invention that the above condition corresponds to an ideal braking pressure reaction.

L1 corresponds to a case in which the diameter of the fluid resistance holes 48 is 0.1 mm, and the brake pedal is moved by 1.05 mm to output a braking pressure of 1 kgf/cm$^2$. L2 corresponds to a case in which the diameter of the fluid resistance holes 48 is 0.5 mm, and the brake pedal is moved by 1.55 mm to output a braking pressure of 1 kgf/cm$^2$. L3 corresponds to a case in which the diameter of the fluid resistance holes 48 is 0.7 mm, and the brake pedal is moved by 2.95 mm to output a braking pressure of kgf/cm$^2$. L4 corresponds to a φ25.4 M/CYL master cylinder that has no fluid resistance hole 48 in the brake port 16 that is currently mass-produced and mounted on a vehicle, and the brake pedal is moved by 3.7 mm or more to output a braking pressure of 1 kgf/cm$^2$.

A line close to an ideal one may be obtained if the diameter of the fluid resistance holes 48 is less than 0.1 mm, but a drag phenomenon in which a braking force is generated irrespective of the intention of the driver may occur as in the case of having no fluid resistance hole. In contrast, there is almost no difference from L4 that corresponds to a mass-produced product if the diameter of the fluid resistance holes 48 exceeds 0.7 mm, but rather a time necessary for forming a braking pressure; that is, a lost travel section increases due to the brake liquid discharged to the reservoir through the fluid resistance holes during a lost travel.

Figure 5:
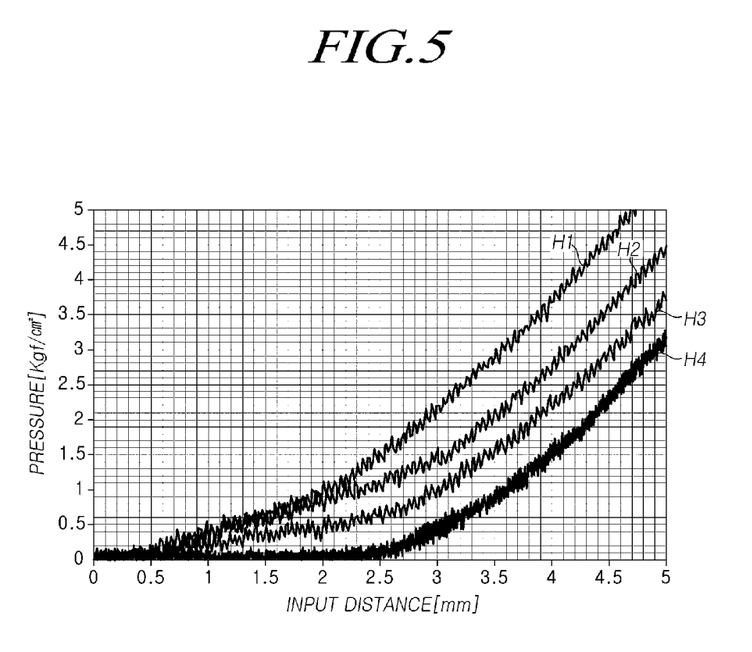
FIG. 5 is a graph for explaining the number of fluid resistance holes of the master cylinder for a brake system and an effect thereof according to an embodiment of the present invention.

FIG. 5 is a graph illustrating an input distance (a movement distance of a brake pedal) necessary to reach a predetermined braking pressure according to the number of the fluid resistance holes.

In the graph, an ideal line for a predetermined braking pressure reaction is not indicated, in which H1 corresponds to a case in which the number of the fluid resistance holes 48 is one, H2 corresponds to a case in which the number of the fluid resistance holes 48 is two, H3 corresponds to a case in which the number of the fluid resistance holes 48 is three, and H4 corresponds to a mass-production type master cylinder having no fluid resistance hole.

As illustrated, when one to three fluid resistance holes 48, which have a diameter of 0.1 mm to 0.7 mm, are provided in the brake liquid port, a drag may be prevented and a lost travel section may be effectively reduced. Meanwhile, because one fluid resistance hole 48 may be blocked by foreign substances included in the brake liquid, two or three fluid resistance holes 48 is preferable. In contrast, there is almost no difference from H4 that corresponds to a mass-produced product if the number of the fluid resistance holes 48 exceeds three, but rather a time necessary for forming a braking pressure; that is, a lost travel section increases due to the brake liquid that is discharged to the reservoir through the fluid resistance holes during a lost travel as in the case of FIG. 4.

Hereinafter, an operation of the master cylinder for a brake system including the above-described valve unit will be described.

In general, a braking operation is not generated immediately after a pedal effort is applied to a brake pedal (not illustrated), but is started after the brake pedal is moved forwards to a degree. That is, a section from a point when the brake pedal starts to be trodden to a point when a brake operation starts is called a lost travel section (hereinafter, referred to as 'an LT section'), and the driver experiences a much better braking feeling as the LT section becomes shorter. In the embodiment of the present invention, the LT section may be reduced and the braking feeling may be improved by preventing a drag that is irrelevant to the intention of the driver by using the fluid resistance holes 48 of the valve unit and improving the initial amount of the brake liquid that is discharged through the brake liquid discharge opening 13.

In more detail, in the braking operation, first, the first piston 20 is pressed and moved forwards by an initial braking operation in order to compress the first liquid pressure chamber 12, and the second liquid pressure chamber 14 is compressed while the second piston 30 is pressed and moved forwards by the pressure by which the first liquid pressure chamber 12 is compressed. Then, the brake liquid in the first liquid pressure chamber 12 is supplied to the wheel brakes FR and RL through the first brake liquid discharge opening 13 by the pressure by which the first piston 20 is pressed, and the brake liquid in the second liquid pressure chamber 14 is supplied to the wheel brakes FL and RR through the second brake liquid discharge opening 15 by the pressure by which the second piston 20 is pressed.

Meanwhile, because the brake liquid (about 0.3 cc to 0.5 cc) that is increased by the fluid resistance holes 48, according to the embodiment of the present invention, is added to the brake liquid that is discharged from the first and second liquid pressure chambers 12 and 14 and to the brake liquid discharge openings 13 and 15 at the initial stage of the braking operation and is supplied to the wheel brakes, the braking hydraulic pressure at the initial stage of the braking operation increases in order to reduce the LT section.

Subsequently, for example, when the communication passages 22 and 32 pass by the sealing member 17 after the LT section in which the first and second pistons 20 and 30 are moved further by a predetermined distance, and the master cylinder performs its original function. That is, as the first and second pistons 20 and 30 are moved forwards (moved to the left side) and the communication passages 22 and 32 of the first and second pistons 20 and 30 pass by the sealing member 17, the first and second liquid pressure chambers 12 and 14 are sealed and the internal pressure of the liquid pressure chambers 12 and 14 increase. Then, because the first and second pistons 20 and 30 are continuously moved forwards, the brake liquid in the first and second liquid pressure chambers 12 and 14 is moved to the reservoir through the fluid resistance holes 48 of the first and second brake liquid ports 16 and 18 in order to release the pressure of the reservoir and is supplied to the wheel brakes of the wheels through the first and second brake liquid discharge openings 13 and 15 to perform a braking operation.

If the braking operation is released, the first and second pistons 20 and 30 are pushed rearwards by the resilient forces of the first return spring 23 and the second return spring 33 and return to the original state.

In more detail, in the operation of the check valve 41, the valve body 43 is opened with respect to the valve housing 41 while the interiors of the first and second liquid pressure chambers 12 and 14 are vacuumed when the braking operation is released so that the brake liquid in the reservoir is supplied to the liquid pressure chambers 12 and 14 through the first and second brake liquid ports 16 and 18. It is impossible to fill with a sufficient amount of brake liquid necessary for a secondary braking operation in the liquid pressure chamber 12 for a short time with only the fluid resistance holes 48 without the check valve 41. After the braking operation is released, the residual brake liquid of the brake liquid supplemented in the liquid pressure chambers 12 and 14 may return to the reservoir through the fluid resistance hole 48. If the brake liquid in the liquid pressure chambers 12 and 14 is completely supplemented, the first and second pistons 20 and 30 normally return to the original positions and the check valve 41 is closed.

What is claimed is:

1. A master cylinder for a brake system, comprising:
   a cylinder body having a bore therein;
   at least one piston provided in the bore to be moved forwards and rearwards;
   a liquid pressure chamber compressed by the piston;
   a brake liquid port connected to a reservoir and configured to supply a brake liquid to the liquid pressure chamber; and
   a brake liquid discharge opening for discharging the brake liquid in the liquid pressure chamber to a wheel brake of a wheel,
   wherein a valve unit comprising a check valve for controlling unidirectional flows of the brake liquid introduced from the reservoir to the liquid chamber and a fluid resistance hole opened in two directions and having a size smaller than the size of the brake liquid discharge opening is provided in the brake liquid port,
   wherein the cylinder body has accommodation grooves on an inner surface of the bore so that a sealing member and a packing member are fixed inside the accommodation grooves to seal an inside of the cylinder body, and
   wherein two or three fluid resistance holes are provided.

2. The master cylinder of claim 1, wherein the cross-sectional shape of each of the fluid resistance holes is circular and the diameter thereof is 0.1 mm to 0.7 mm.

3. The master cylinder of claim 1, wherein the check valve comprises:
   a valve housing having a communication hole at the center thereof;
   a valve body elevated on a lower side of the communication hole and configured to open and close the communication hole;
   a valve spring supporting the valve body and configured to close the communication hole by pressing the valve body towards the communication hole; and
   a valve seat coupled to the valve housing while supporting the valve spring, and
   wherein the two or three fluid resistance holes are provided around the communication hole of the valve housing.

4. The master cylinder of claim 3, wherein a circumferential groove is formed on the outer peripheral surface of the valve housing, and a ring-shaped resilient member is coupled to the groove.

5. The master cylinder of claim 3, wherein the two or three fluid resistance holes are circumferentially spaced apart from each other around the communication hole of the valve housing.

6. A master cylinder for a brake system, comprising:
   a cylinder body having a bore therein;
   at least one piston provided in the bore to be moved forwards and rearwards;
   a liquid pressure chamber compressed by the piston;
   a brake liquid port connected to a reservoir and configured to supply a brake liquid to the liquid pressure chamber; and
   a brake liquid discharge opening for discharging the brake liquid in the liquid pressure chamber to a wheel brake of a wheel,
   wherein a valve unit comprising a check valve closed during a braking operation and opened when the braking operation is released, the check valve being configured to supply the brake liquid from the reservoir to the liquid pressure chamber, and a fluid resistance hole opened in two directions and configured to discharge a large amount of the brake liquid in the liquid pressure chamber to the brake liquid discharge opening during the braking operation is provided in the brake liquid port,
   wherein the cylinder body has accommodation grooves on an inner surface of the bore so that a sealing member and a packing member are fixed inside the accommodation grooves to seal an inside of the cylinder body, and
   wherein two or three fluid resistance holes are provided.

7. The master cylinder of claim 6, wherein each of the two or three fluid resistance holes is smaller than the brake liquid discharge opening.

8. The master cylinder of claim 6, wherein the cross-sectional shape of each of the fluid resistance holes is polygonal.

9. The master cylinder of claim 6, wherein the cross-sectional shape of each of the fluid resistance holes is circular and the diameter thereof is 0.1 mm to 0.7 mm.

10. The master cylinder of claim 6, wherein the check valve comprises:
    a valve housing having a communication hole at the center thereof;
    a valve body elevated on a lower side of the communication hole and configured to open and close the communication hole;
    a valve spring supporting the valve body and configured to close the communication hole by pressing the valve body towards the communication hole; and
    a valve seat coupled to the valve housing while supporting the valve spring, and
    wherein the two or three fluid resistance holes are provided around the communication hole of the valve housing.

11. The master cylinder of claim 6, wherein each of the fluid resistance holes comprises a porous filter to reduce the fluid velocity of the brake liquid that is discharged through the brake liquid discharge opening during a braking operation.

12. The master cylinder of claim 11, wherein the check valve comprises:
    a valve housing having a communication hole at the center thereof;
    a valve body elevated on a lower side of the communication hole and configured to open and close the communication hole;

a valve spring supporting the valve body and configured to close a passage by pressing the valve body towards the communication hole; and a valve seat coupled to the valve housing while supporting the valve spring, and wherein the two or three fluid resistance holes are provided around the communication hole.

13. The master cylinder of claim 1, wherein the at least one piston includes:

a spring accommodation recess, which is grooved into the at least one piston, accommodating a return spring; and a support, on which a spring retainer is mounted, protruding from the spring accommodation recess.

14. The master cylinder of claim 6, wherein the at least one piston includes:

a spring accommodation recess, which is grooved into the at least one piston, accommodating a return spring; and a support, on which a spring retainer is mounted, protruding from the spring accommodation recess.

* * * * *